United States Patent
Snyder, II et al.

(10) Patent No.: US 11,010,165 B2
(45) Date of Patent: May 18, 2021

(54) BUFFER ALLOCATION WITH MEMORY-BASED CONFIGURATION

(71) Applicant: Marvell Asia Pte, Ltd., Singapore (SG)

(72) Inventors: Wilson P. Snyder, II, Marlborough, MA (US); Shahe H. Krakirian, Palo Alto, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 61 days.

(21) Appl. No.: 16/299,486

(22) Filed: Mar. 12, 2019

(65) Prior Publication Data

US 2020/0293318 A1 Sep. 17, 2020

(51) Int. Cl.
| | | |
|---|---|---|
| *G06F 9/30* | (2018.01) | |
| *G06F 9/455* | (2018.01) | |
| *G06F 16/901* | (2019.01) | |
| *G06F 9/38* | (2018.01) | |
| *H04L 29/06* | (2006.01) | |
| *G06F 9/50* | (2006.01) | |

(52) U.S. Cl.
CPC .......... *G06F 9/30134* (2013.01); *G06F 9/38* (2013.01); *G06F 9/45558* (2013.01); *G06F 9/5016* (2013.01); *G06F 16/9017* (2019.01); *H04L 65/80* (2013.01); *G06F 2209/5011* (2013.01)

(58) Field of Classification Search
None
See application file for complete search history.

(56) References Cited

U.S. PATENT DOCUMENTS

| | | | |
|---|---|---|---|
| 6,629,209 B1 | 9/2003 | Arimilli et al. | |
| 7,403,887 B1* | 7/2008 | Bishop | G06F 12/1009 |
| | | | 703/26 |
| 7,562,205 B1* | 7/2009 | Case | G06F 12/1036 |
| | | | 711/209 |
| 8,347,034 B1 | 1/2013 | Chen et al. | |
| 8,745,618 B2 | 6/2014 | Lin et al. | |
| 8,943,273 B1 | 1/2015 | Jamil et al. | |
| 9,015,351 B1 | 4/2015 | Geddes et al. | |
| 9,379,992 B2 | 6/2016 | Snyder, II et al. | |
| 9,529,532 B2 | 12/2016 | Kessler et al. | |
| 10,282,299 B2 | 5/2019 | Mukherjee et al. | |
| 2004/0117558 A1 | 6/2004 | Krick et al. | |
| 2004/0165609 A1* | 8/2004 | Herbst | H04L 12/56 |
| | | | 370/412 |

(Continued)

OTHER PUBLICATIONS

Non-final Office Action for U.S. Appl. No. 16/425,209, dated Jun. 25, 2020.

(Continued)

*Primary Examiner* — Jamaal Henson
(74) *Attorney, Agent, or Firm* — Hamilton, Brook, Smith & Reynolds, P.C.

(57) ABSTRACT

A network processor provides for buffer allocation in a manner supporting virtual machines. Each memory allocation request is associated with an aura and a pool, which can be assigned to distinct virtual functions. When parsing a request, lookup tables for the auras and pools are generated and expanded as needed to accommodate any number of concurrent functions. Based on the identified pool of the request, a corresponding stack of pointers is accessed, and a pointer is returned to enable access to the memory.

21 Claims, 8 Drawing Sheets

(56) References Cited

U.S. PATENT DOCUMENTS

| | | |
|---|---|---|
| 2008/0130655 A1* | 6/2008 | Herbst .................... H04L 69/16 |
| | | 370/395.7 |
| 2010/0169582 A1 | 7/2010 | Hinton et al. |
| 2011/0010503 A1 | 1/2011 | Yamamura et al. |
| 2014/0032829 A1 | 1/2014 | Solihin |
| 2014/0032854 A1 | 1/2014 | Lih et al. |
| 2015/0032962 A1 | 1/2015 | Buyuktosunoglu et al. |
| 2015/0067264 A1 | 3/2015 | Eckert et al. |
| 2016/0335190 A1 | 11/2016 | Li et al. |
| 2016/0350229 A1 | 12/2016 | Reed |
| 2018/0121354 A1* | 5/2018 | Ishiyama ............ G06F 12/0246 |
| 2018/0373635 A1 | 12/2018 | Mukherjee et al. |

OTHER PUBLICATIONS

Non-Final Office Action for U.S. Appl. No. 16/425,435, dated May 21, 2020.
Non-Final Office Action for U.S. Appl. No. 16/425,462, dated Apr. 6, 2020.
Final Office Action for U.S. Appl. No. 16/425,462, dated Oct. 16, 2020.
Mohammad, Baker, *Embedded Memory Design for Multi-Core and Systems on Chip*, Springer (2014).

* cited by examiner

AURA TABLE (FOR GIVEN $VF_N$)

| ADDRESS | CONTENT | |
|---|---|---|
| [BASE($VF_N$)+AURA0] | AURA0 | POOL0_PTR |
| [BASE($VF_N$)+AURA7] | AURA7 | POOL3_PTR |
| [BASE($VF_N$)+AURA8] | AURA8 | POOL3_PTR |
| [BASE($VF_N$)+AURA12] | AURA12 | POOL5_PTR |
| [BASE($VF_N$)+AURA32] | AURA32 | POOL7_PTR |
| [BASE($VF_N$)+AURA33] | AURA33 | POOL7_PTR |

POOL TABLE (FOR GIVEN VF$_N$)

| ADDRESS | CONTENT |
|---|---|
| [POOL0_PTR] | POOL0 \| STACK0 ADDRESS |
| [POOL3_PTR] | POOL3 \| STACK3 ADDRESS |
| [POOL5_PTR] | POOL5 \| STACK5 ADDRESS |
| [POOL7_PTR] | POOL7 \| STACK7 ADDRESS |

STACK (FOR GIVEN $VF_N$ AND POOL)

| ADDRESS | CONTENT |
|---|---|
| [STACK0 ADDRESS] | POINTER0 <br> POINTER1 <br> POINTER2 <br> POINTER3 <br> POINTER4 <br> POINTER5 <br> ⋮ <br> POINTERn <br> 352 |

FIG. 8

BUFFER ALLOCATION WITH MEMORY-BASED CONFIGURATION

BACKGROUND

The Open Systems Interconnection (OSI) Reference Model defines seven network protocol layers (L1-L7) used to communicate over a transmission medium. The upper layers (L4-L7) represent end-to-end communications and the lower layers (L1-L3) represent local communications.

Networking application-aware systems operate to process, filter and switch a range of L3 to L7 network protocol layers, for example, L7 network protocol layers such as, HyperText Transfer Protocol (HTTP) and Simple Mail Transfer Protocol (SMTP), and L4 network protocol layers such as Transmission Control Protocol (TCP). In addition to processing the network protocol layers, the networking application aware systems need to simultaneously secure these protocols with access and content based security through L4-L7 network protocol layers including Firewall, Virtual Private Network (VPN), Secure Sockets Layer (SSL), Intrusion Detection System (IDS), Internet Protocol Security (IPsec), Anti-Virus (AV) and Anti-Spam functionality at wire-speed. IPsec, in particular, is a framework of standards for providing secure communications over IP networks through the use of cryptographic security services. IPsec supports network-level peer authentication, data integrity, authentication of data origin, data encryption, and replay protection.

Improving the efficiency and security of network operation in today's Internet world remains an ultimate goal for Internet users. Access control, traffic engineering, intrusion detection, and many other network services require the discrimination of packets based on multiple fields of packet headers, which is called packet classification.

Typical network processors schedule and queue work such as packet processing operations for upper level network protocols, and allow processing with respect to upper level network protocols (e.g., transport and application layers) in received packets before forwarding the packets to connected devices. The functions typically performed by network processors include packet filtering, queue management and priority, quality of service enforcement, and access control. By employing features specific to processing packet data, network processors can optimize an interface of a networked device.

SUMMARY

Example embodiments include a method of allocating a memory. Upon receipt of an request to allocate a pointer to a memory, the request may be parsed to determine a corresponding aura identifier (ID). A pool pointer may then be determined based on the aura ID. A pool table entry may be generated as a function of the pool pointer, and the pool table entry may be written to a pool table, thereby updating the pool table by incorporate the entry. A stack address may be determined based on the pool pointer, and a pointer from the stack may be allocated for the request. The allocated pointer may then be sent to the entity originating the request.

An aura table entry may be generated as a function of the aura ID and a base address. The pool pointer may be determined according to the aura table, wherein the pool pointer is associated with the stack of pointers to the memory. The aura ID may indicate a class of the request, the class being at least one of a priority and color for quality of service (QoS) enforcement. The pool pointer may be one of a plurality of pool pointers, where each of the plurality of pool pointers corresponds to a respective stack of pointers to the memory. The aura ID may be one of a plurality of aura IDs, wherein each of the plurality of pool pointers is associated with at least one of the plurality of aura IDs. Each of the plurality of pool pointers may be associated with a virtual function. The entity originating the request may operate a virtual function associated with the pool pointer.

The aforementioned request may be a first request, which is a memory allocation request. A second request may be received, wherein the second request is a request to free the allocated pointer. To process the second request, a second aura ID (of the second request) may be parsed and processed to determine a second pool pointer based on the second aura ID. A second stack address may then be determined based on the second pool pointer according to the pool table and the stack may be accessed to insert the freed pointer into the stack.

At least a subset of the aura table, pool table and stack may be cached by one or more caches. The operation of generating the entry for the pool table may be a function of a virtual function (e.g., a virtual function identifier) of the request. The pool table, aura table and stack may be stored to the same memory that is being allocated, or may be stored to a separate storage device. Entries of the pool table or aura table may be invalidated in response to a request to free a pointer to the memory.

Further embodiments include a circuit configured to allocate memory. The circuit may comprise an aura stage, a pool stage, and a stack stage. The aura stage may be configured to 1) determine an aura identifier (ID) of a request to allocate a pointer to a memory, and 2) determine a pool pointer based on the aura ID. The pool stage may be configured to 1) generate a pool table entry as a function of the pool pointer, 2) write a pool table entry to a pool table, and 3) determine a stack address based on the pool table entry. The stack stage configured to 1) allocate a pointer of the stack to the request, and 2) output the pointer to an entity originating the request.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

Figure 1:
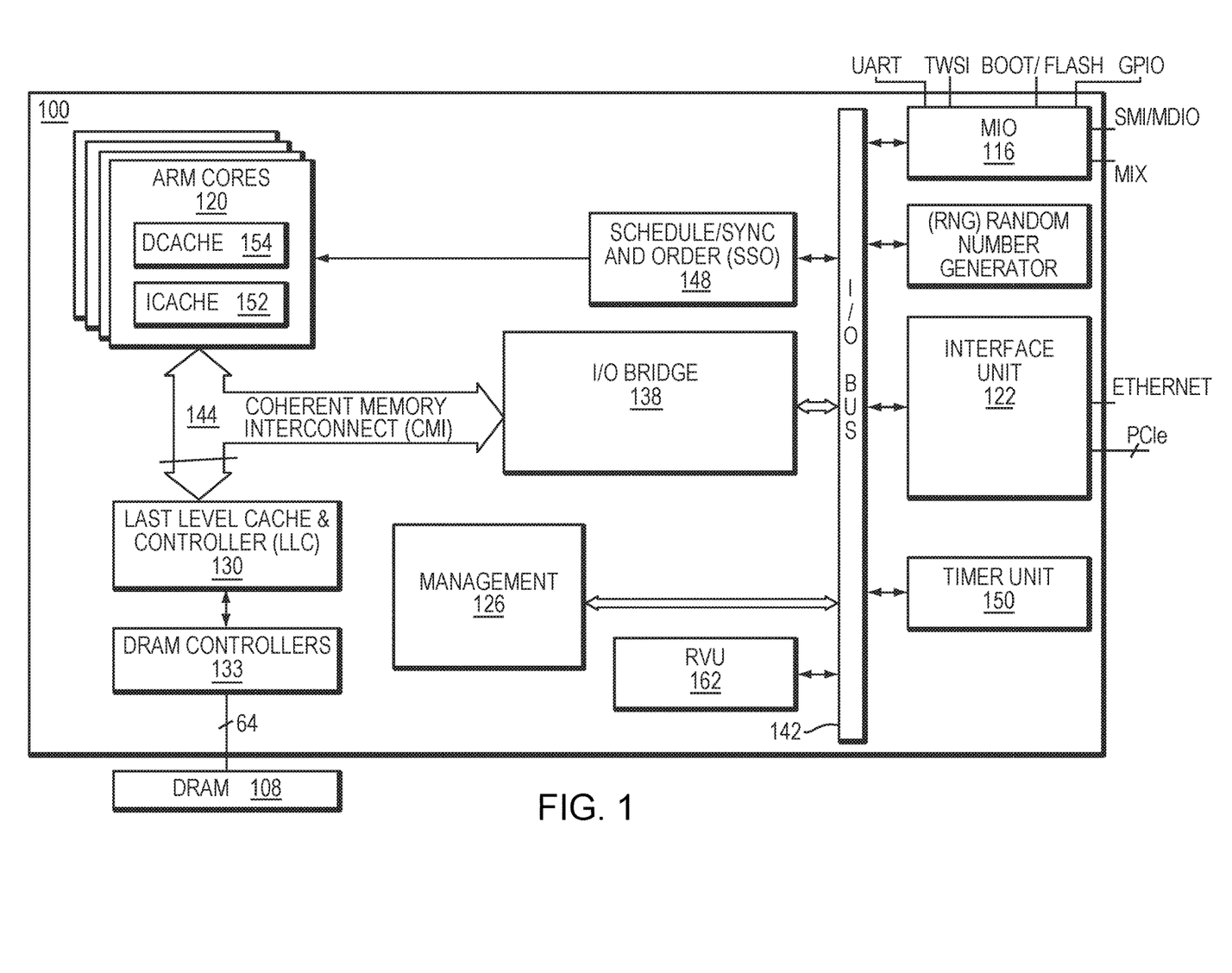
FIG. 1 is a block diagram illustrating a network services processor in which embodiments of the present invention may be implemented.

FIG. 1 is a block diagram illustrating a network services processor 100. The network services processor 100 may process Open System Interconnection network L2-L7 layer protocols encapsulated in received packets. As is well-known to those skilled in the art, the Open System Interconnection (OSI) reference model defines seven network protocol layers (L1-L7). The physical layer (L1) represents the actual interface, electrical and physical that connects a device to a transmission medium. The data link layer (L2) performs data framing. The network layer (L3) formats the data into packets. The transport layer (L4) handles end to end transport. The session layer (L5) manages communications between devices, for example, whether communication is half-duplex or full-duplex. The presentation layer (L6) manages data formatting and presentation, for example, syntax, control codes, special graphics and character sets. The application layer (L7) permits communication between users, for example, file transfer and electronic mail.

The network services processor 100 may schedule and queue work (packet processing operations) for upper level network protocols, for example L4-L7, and allow processing of upper level network protocols in received packets to be performed to forward packets at wire-speed. Wire-speed is the rate of data transfer of the network over which data is transmitted and received. By processing the protocols to forward the packets at wire-speed, the network services processor does not slow down the network data transfer rate.

A packet is received for processing by an interface unit 122. The interface unit 122 performs pre-processing of the received packet by checking various fields in the network protocol headers (e.g., L2, L3 and L4 headers) included in the received packet, and may perform checksum checks for TCP/User Datagram Protocol (UDP) (L3 network protocols). The interface unit 122 may receive packets via multiple network interface protocols, such as Ethernet and Peripheral Component Interconnect Express (PCIe). In a further embodiment, the interface unit 122 may be configured to receive packets from a plurality of X Attachment Unit Interfaces (XAUI), Reduced X Attachment Unit Interfaces (RXAUI), Serial Gigabit Media Independent Interfaces (SGMII), 40 GBASE-R, 50 GBASE-R, and/or 100 GBASE-R. The interface unit 122 may also prepare and transmit outgoing packets via one or more of the aforementioned interfaces.

The interface unit 122 may then writes packet data into buffers in the last level cache and controller (LLC) 130 or external DRAM 108. The packet data may be written into the buffers in a format convenient to higher-layer software executed in at least one of the ARM processor cores 120. Thus, further processing of higher level network protocols is facilitated.

The network services processor 100 can also include one or more application specific co-processors. These co-processors, when included, offload some of the processing from the cores 120, thereby enabling the network services processor to achieve high-throughput packet processing.

An I/O bridge 138 is configured to manage the overall protocol and arbitration and provide coherent I/O portioning with an I/O Bus 142. The I/O bridge 138 may include buffer queues for storing information to be transferred between a coherent memory interconnect (CMI) 144, the I/O bus 142, and the interface unit 122. The I/O bridge 138 may comprise a plurality of individual bridges on which communications and arbitration can be distributed.

The miscellaneous I/O interface (MIO) 116 can include auxiliary interfaces such as General Purpose I/O (GPIO), Flash, IEEE 802 two-wire Management Data I/O Interface (MDIO), Serial Management Interface (SMI), Universal Asynchronous Receiver-Transmitters (UARTs), two wire serial interface (TWSI), and other serial interfaces.

A Schedule/Sync and Order (SSO) module 148 queues and schedules work for the processor cores 120. Work is queued by adding a work queue entry to a queue. For example, a work queue entry is added by the interface unit 122 for each packet arrival. A timer unit 150 is used to schedule work for the processor cores 120.

Processor cores 120 request work from the SSO module 148. The SSO module 148 selects (i.e., schedules) work for one of the processor cores 120 and returns a pointer to the work queue entry describing the work to the processor core 120.

The processor core 120, in turn, includes instruction cache 152, Level-1 data cache 154. In one embodiment, the network services processor 100 includes 24 ARM processor cores 120. In some embodiments, each of the ARM processor cores 120 may be an implementation of the ARMv8.2 64-bit architecture, and may be compatible with the ARMv8.2 software ecosystem and include hardware floating point, SIMD, and MMU support. In such an embodiment, consistent with the ARMv8.2 architecture, the cores 120 may contain full hardware support for virtualization. Guest operating systems can thus run at ARM defined user and operating system privilege levels, and hypervisor software can run in a separate higher privilege level. The cores 120 may also supports a secure state in which software may run in three different privilege levels while hardware provides isolation from the nonsecure state.

Last level cache and controller (LLC) 130 and external DRAM 108 are shared by all of the processor cores 120 and I/O co-processor devices. Each processor core 120 is coupled to the LLC 130 by the CMI 144. The CMI 144 is a communication channel for all memory and I/O transactions between the processor cores 120, the I/O bridge 138 and the LLC 130. In one embodiment, the CMI 144 is scalable to multiple (e.g., 24) processor cores 120, supporting fully-coherent Level-1 data caches 154 with write through. The CMI 144 may be highly-buffered with the ability to prioritize I/O.

The controller of the LLC 130 maintains memory reference coherence. It returns the latest copy of a block for every fill request, whether the block is stored in LLC 130, in external DRAM 108, or is "in-flight." A plurality of DRAM controllers 133 supports the external DRAM 108, and can support preferred protocols, such as the DDR4 protocol.

After a packet has been processed by the processor cores 120, the interface unit 122 reads the packet data from the LLC 130, DRAM 108, performs L4 network protocol post-processing (e.g., generates a TCP/UDP checksum), forwards the packet through the interface unit 122 and frees the LLC 130/DRAM 108 used by the packet. The DRAM Controllers 133 manage in-flight transactions (loads/stores) to/from the DRAM 108.

A resource virtualization unit (RVU) 162 may enable software to map various local function (LF) resources in various modules into several physical functions (PFs) and virtual functions (VFs). This enables multi-unit software drivers compatible with Linux, Windows and DPDK.

A management module 126 may include various units for managing operation of the network services processor 100. For example, the management module 126 may include a temperature sensor, a power serial bus master interface to determine current performance and energy consumption, and a memory diagnostic controller to detect and report memory errors. The module 126 may further include control processors, such as a system control processor for power management and other secure chip management tasks, and a module control processor for module management and other nonsecure chip management tasks.

Figure 2:
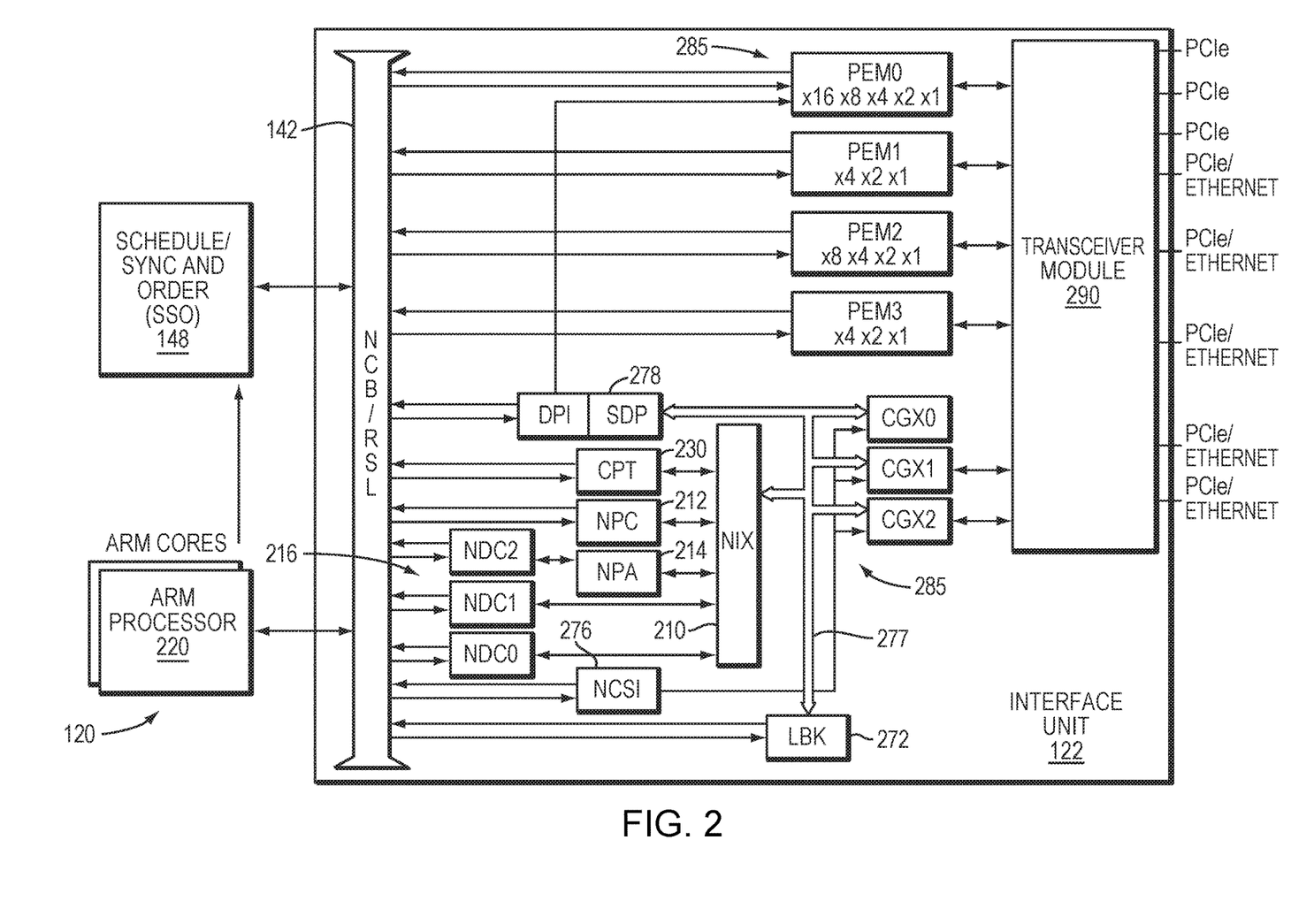
FIG. 2 is a block diagram of a networking and input/output portion of the network services processor of FIG. 1.

FIG. 2 is a block diagram of the interface unit 122 in further detail. Transceiver module 290 transmits and receives signals in accordance with one or more communications protocols, such as PCIe, Ethernet. Interface modules 285, including PCI Express interface units (PEM0-PEM3), and Ethernet I/O controllers (CGX0-CGX2) process received and outgoing signals in accordance with their respective protocols. A network controller sideband interface (NCSI) unit 276 provides an interface and protocol controller for a NCSI bus 277, which provides network packet data from/to the CGX interface modules 285.

A network interface unit (NIX) 210 provides a controller and direct memory access (DMA) engines to process and move network packets. The NIX 210 transmits and receives packets to and from the aforementioned interfaces 285, and communicates with the SSO module 148 to schedule work for the cores 120 to further process the packets. The NIX may also communicate with the cores 120 to forward work in lieu of the SSO 148, and can receive packets from the cores 120 for transmission. The cores 120, shown in FIG. 1, may include processors such as an ARM processor 220 as shown in FIG. 2. The NIX may include a transmit subunit (NIX-TX) and a receive subunit (NIX-RX), and a loopback module (LBK) 272 enables packets transmitted by NIX-TX to be looped back and received by NIX-RX.

The NIX 210 operates with a number of coprocessors. In particular, a network parser CAM unit (NPC) 212 parses network packets received for or transmitted from the NIX. A network pool allocator unit (NPA) 214 may allocate and free pointers for packet, work-queue entry, send descriptor buffers, and may support integration with a virtualization scheme. The SSO 148, as described above, schedules work-queue entries for NIX packets. A cryptographic accelerator unit (CPT) 230 optionally decrypts Internet Protocol Security (IPsec) packets received by the NIX 210 and can encrypt data for outgoing packets. A data cache (NDC0-NDC1) 216 is a common data cache block for use by the NIX 210 and NPA 214.

Previous embodiments, disclosed in U.S. Pat. No. 9,379, 992 (the entirety of which is incorporated herein by reference), provide a network buffer allocator to support virtual machines. In such embodiments, buffer pointers are requested to be allocated by software (e.g., a core) or hardware (e.g., a network adapter). This agent requested a buffer pointer allocation by providing an "aura," which is a number under a given virtual function (VF). The aura and VF is then mapped to a pool, and from that pool, a corresponding stack is popped, returning the free buffer address. Likewise, software or hardware could free buffers by providing an aura, VF and buffer address, which was mapped to a pool and, in turn, a stack to be pushed with the buffer address.

Such embodiments, as implemented, may utilize hardware structures of a certain size, (e.g., 4K auras and 256 pools). These hardware structures may present certain drawbacks. First, such a hardware limit can restrictive to software. For example, a large number of queues may be needed in a system supporting remote direct memory access (RDMA), whereby pools must be assigned to one of a large number of user processes. Many RDMA drivers, for example, support 64K or 1M processes. Implementing hardware-fixed storage for 1M processes would be impractical. A second potential drawback is that a system may have need for many fewer auras or pools, and an embodiment implementing storage for a much larger number of auras/pools than required may be wasteful of silicon area (i.e., cost) and power.

Figure 3:
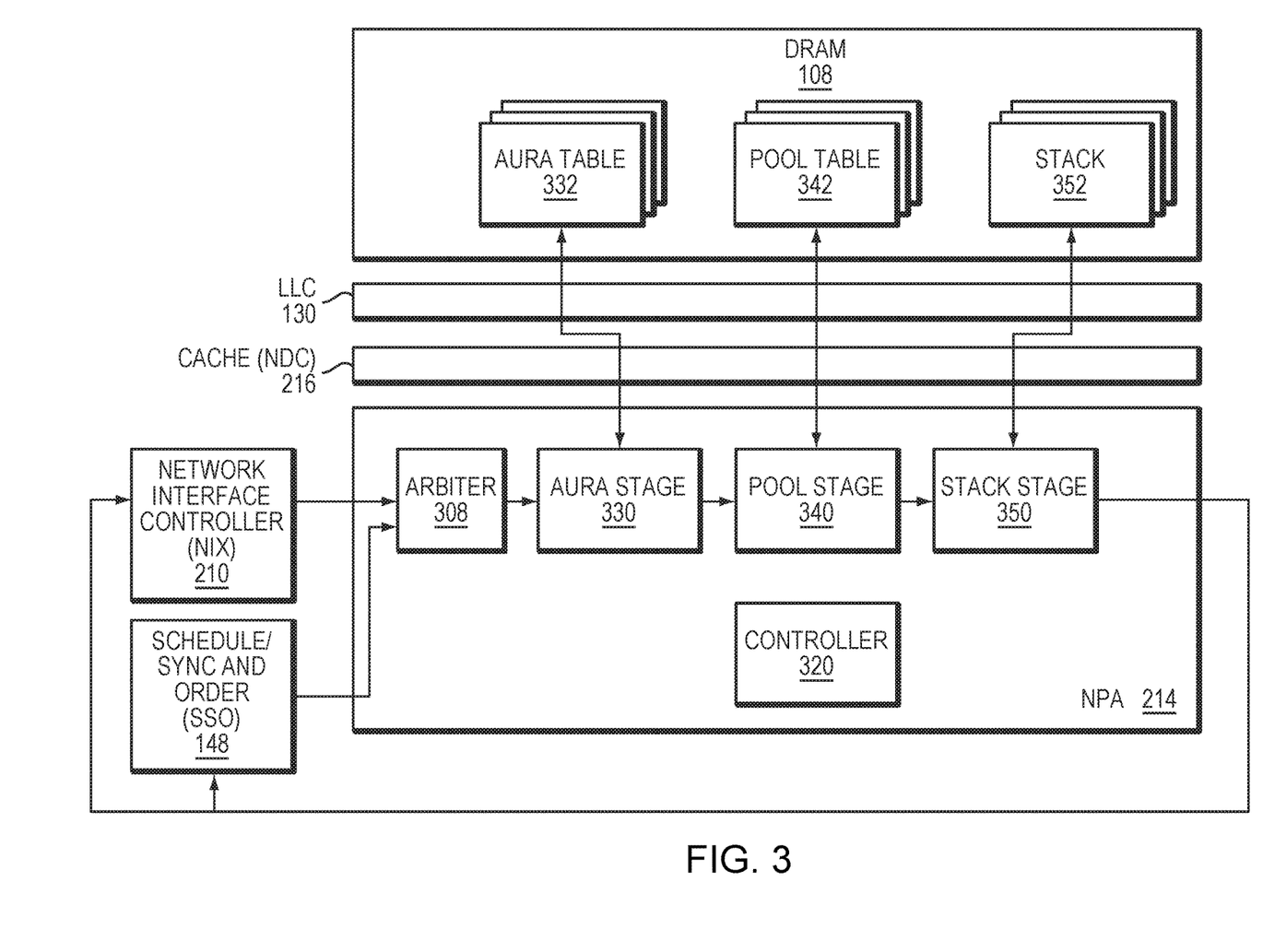
FIG. 3 is a block diagram of components operating to allocate memory in one embodiment.

FIG. 3 is a block diagram of a subset of the components of the network services processor 100 implemented in allocating memory. The NIX 210 may determine a requirement for a memory allocation for processing or moving a packet, or may receive such a request from one of the cores 120 (FIGS. 1-2). Accordingly, the NIX 210 forwards an allocation request to the NPA 214, which allocates and frees pointers for packet, work-queue entry, send descriptor buffers, and other work processes. In response, the NPA 214 processes the allocation request to allocate a memory block at the DRAM 108, returning a pointer to the memory block to the NIX 210. The allocated memory block and NPA control structures (332, 342, 352) may optionally be cached by one or more caches, such as the NDC 216 or the LLC 130. In further embodiments, the NPA 214 may receive allocation requests from one or more other hardware or software entities, such as a network interface card.

To support integration with a virtualization scheme, the NPA 214 may distinguish allocation requests by one or more identifiers specific to the given virtual function, and may organize the memory allocations in accordance with those identifiers. For example, a given virtual function (or, alternatively, a given core or work process) may each be assigned one or more pools of memory blocks (also referred to as buffers) within the DRAM 108. To allocate such memory blocks, each pool may correspond to a "stack" of pointers, where each pointer corresponds to a memory block of the pool. In order to support process flow control or prioritization of resources, each pool may also be associated with one or more "auras." Each aura may correspond to one or more categories (e.g., packet color) for prioritization and/or quality of service (QoS) enforcement class of the request. Thus, a given process, core or virtual function may be assigned one or more pools of memory blocks, and those memory blocks may be allocated based on one or more auras associated with those pools.

Figure 4:
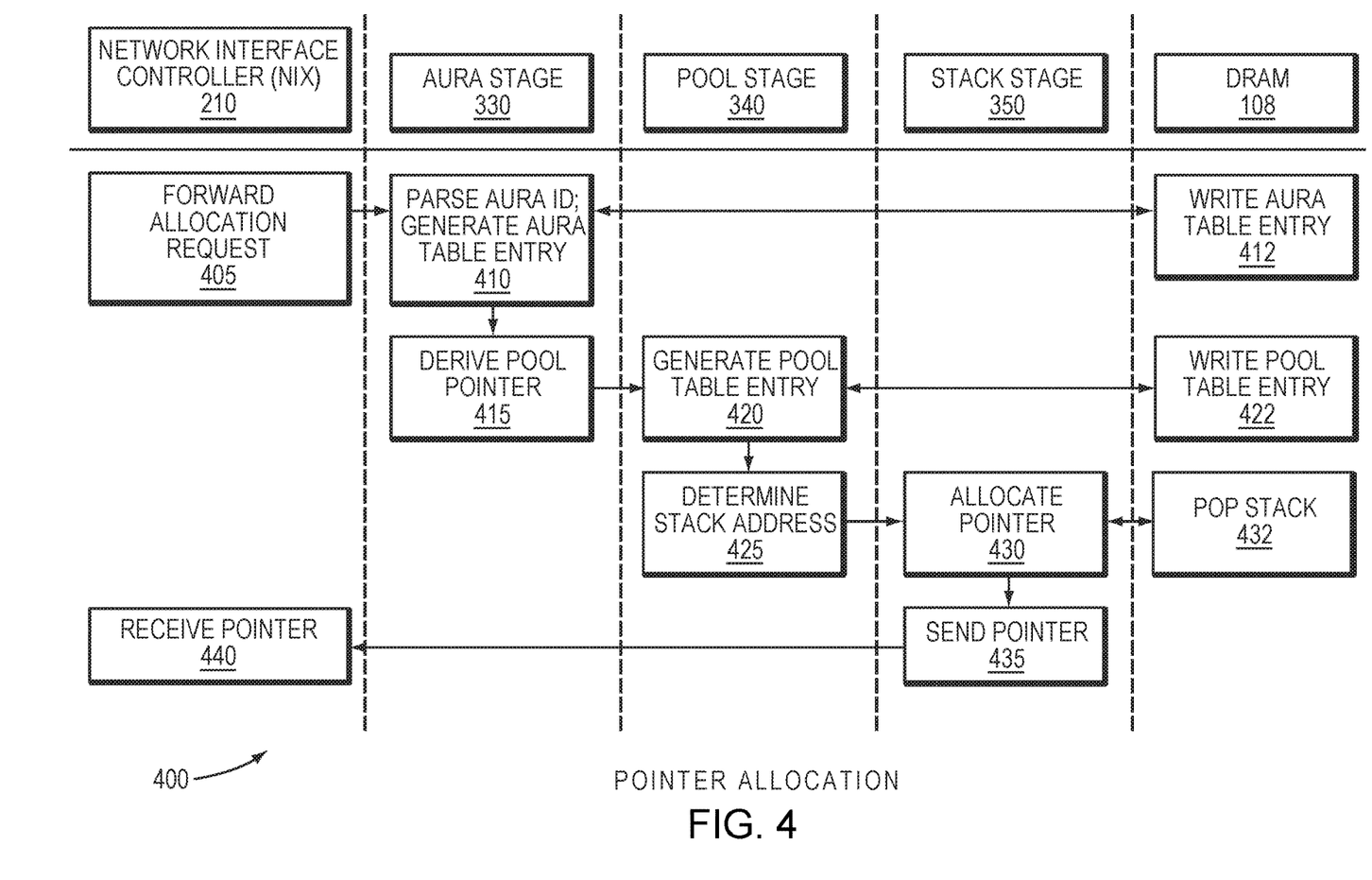
FIG. 4 is a flow diagram of a memory allocation operation in one embodiment.

FIG. 4 is a flow diagram of an example process 400 of allocating a memory block. With reference to FIG. 3, the NIX 210, SSO 148, or another co-processor may forward the allocation request (405), which can include a virtual machine identifier (e.g., a VF number) and an aura identifier (ID) indicating an aura associated with the request. Optionally, an arbiter 308 may select between different types and sources of requests, determining a next request to process at the NPA 214. An aura stage 330 may parse the request to determine the aura ID (410). To determine a pool associated with the aura ID, the aura stage 330 may first generate an entry at the aura table 332 stored at the DRAM 108 (or another storage device) as a function of the aura ID and a base address for the given aura table for the VF in the DRAM 108. For example, for each aura table entry, the aura stage 330 may begin with the base address for a given VF's aura number 0, and then formulaically offset the base address by the aura ID or a value based on the aura ID. The aura stage 330 may then read or write the aura table entry to the corresponding aura table 332 at the determined address (412). The aura table entry may include information identifying the aura, as well as a pointer to the pool associated with the aura. Accordingly, the aura stage 330 may then reference the aura table entry to derive a pointer to pool information, which points to information on the associated pool (415).

The aura stage 330 may then forward the pool pointer to a pool stage 340. The pool stage 340 may then (optionally) generate a pool table entry (420) and read/write the pool table entry to the corresponding pool table 342 at the determined pool address pointer (422). The pool table entry may include information identifying the pool, as well as the stack associated with the aura. The pool stage 340 may then reference the pool table entry to derive a stack address, which points to the associated stack (425) (for that given VF and pool).

Upon receipt of the stack address, a stack stage 350 may then access the associated stack to allocate a pointer of the stack 352 for the allocation request (430). To do so, the stack stage 350 may cause the DRAM 108 to "pop" the stack 352, releasing the next available pointer in the stack (432). The stack stage 350 may then retrieve the pointer and forward it to the NIX 210 (435), where it may be utilized for memory storage by the requesting entity (440).

Once a memory block is no longer needed by the requesting entity, the corresponding pointer may be returned to the stack. A process comparable to the allocation process 400 may be implemented to "free" the pointer, and an example free process is described below with reference to FIG. 5.

A pointer allocation or free may require updates to the pool information, such as changing the stack pointer stored in the pool table 342, changing the number of buffers available to the pool, and/or incrementing statistics related to the request (e.g., the number of requests performed). Accordingly, the pool stage 340 may update this information and via a request channel connecting the NPA 214 and DRAM 108, write back the pool information to the pool table 342. Similarly, the allocation or free may require updates to the aura information, such as changing the number of buffers available to the aura, and, in some embodiments, incrementing statistics related to the request (e.g., the number of requests performed). Accordingly, the aura stage 330 may update this information and, via the request channel, write back the aura information to the aura table 114.

Various embodiments may support virtualization by implementing a virtual function (VF) number at each stage, where the VF indicates a given function performed by a virtual machine or process. For example, the VF number may be included in the allocation requested, or may be derived based on the aura ID according to the aura table 332. For each of the VF number, a unique per-VF base address may be provided for the aura table 332. In such an embodiment, a plurality of aura tables may be implemented, where each of the aura tables corresponds to a respective VF. The pool pointer and pool tables may also be configured in this manner.

In some embodiments, some of the information required by the aura stage 330, pool stage 340 and/or stack stage 350 may be cached in one or more locations, such as the NDC 215 or LLC 130, for improved performance. For example, a 256 KB cache may be utilized used for aura, pool and stack caching, backed by a second level cache of 12 MB. Further, software operated by the NPA 214 or externally may set up or modify one or more of the aura table(s) 332, pool table(s) 342, and stack(s) 352 via direct access to the DRAM 108 (optionally via caches 216, 130). Alternatively, a controller 320 may be configured to perform such structure modifications using the hardware agents or similar function agents. For example, the controller 320 may perform some or all of the functions described above regarding updating or modifying the tables 332, 342, and may update the tables 332, 342 to remove entries that are determined to be no longer in use.

The aura stage 330, pool stage 340, and stack stage 350 may be implemented as separate hardware modules, or may be implemented in a common hardware module operating a pipelined process. This hardware module may also integrate the arbiter 308 and/or the controller 320. The operations of the stages 330, 340, 350 describe above may be implemented in hardware, software, or a combination thereof.

The NPA 214, in implementing the process 400 for pointer allocation, provides several advantages. In particular, the aura table(s) 332 and pool table(s) 342 can be configured to have a minimal initial size, or may not yet exist at the outset of operation of the NPA 214. The tables 332, 334 can then be built, entry-by-entry, as required to accommodate each new allocation request as it is received. As a result, the pool and aura reference information can be expanded to accommodate any number of concurrent processes, and occupies no more storage space than necessary for the present number of requests. The aura stage 330, pool stage 340 and/or controller 320 may also detect and eliminate entries of the pools 332 that are no longer in use, thereby maintaining a minimal storage space occupied by the pools 332. In contrast, a fixed hardware structure for maintaining aura and pool information is limited to a fixed number of entries, and continues to occupy a given area and power even if only a small portion of the structure is in use.

Figure 5:
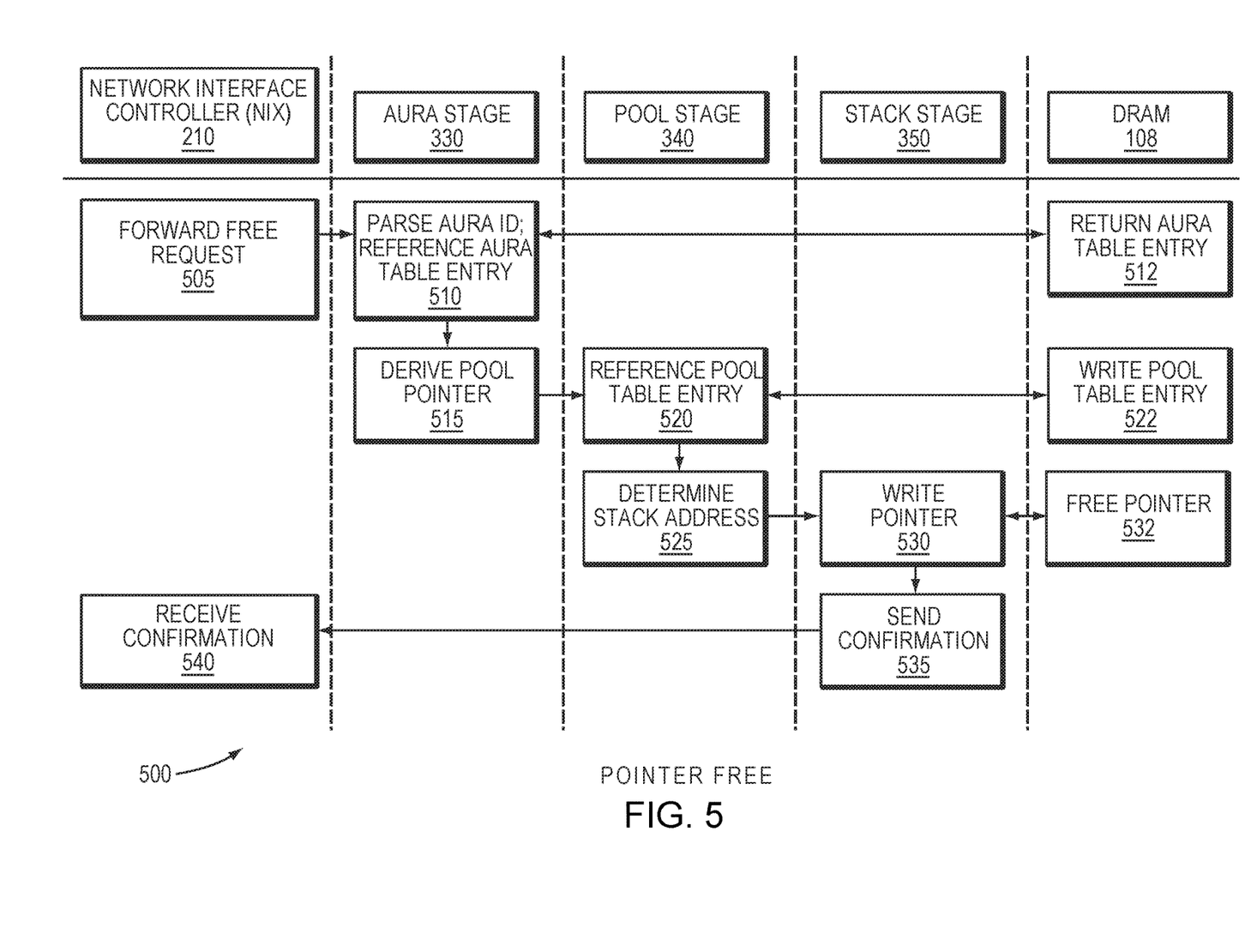
FIG. 5 is a flow diagram of a memory free operation in one embodiment.

FIG. 5 is a flow diagram of an example process 500 of freeing a memory block, also referred to as a free operation. With reference to FIG. 3, the NIX 210 may forward the free request (505), which can include the aura ID indicating the aura associated with the request. An aura stage 330 may parse the request to determine the aura ID (510). To determine the pool associated with the aura ID, the aura stage 330 perform a lookup at the aura table 332 stored at the DRAM 108 (or another storage device) based on the aura ID. For example, the lookup may derive an address for the corresponding entry in a manner comparable to the allocation operation described above, or may search the aura table 332 based on the aura ID. The aura stage 330 may retrieve the corresponding aura table entry from the aura table 332 (512). The aura stage 330 may then reference the aura table entry to derive the pool pointer, which indicates the associated pool (515).

The aura stage 330 may then forward the pool pointer to the pool stage 340. To determine the stack associated with the pool pointer, the pool stage 340 may first perform a lookup of the pool table 342 based on the pool pointer (520). The pool stage 340 may retrieve the pool table entry from the pool table 342 (522). The pool stage 340 may then reference the pool table entry to derive the stack address, which points to the associated stack (525).

Upon receipt of the stack address, the stack stage 350 may then access the associated stack to write a pointer to the stack 352 in accordance with the free request (530). To do so, the stack stage 350 may cause the DRAM 108 to "free" the stack 352, returning the now-available pointer in the stack (532). Optionally, the stack stage 350 may forward a confirmation that the free operation is complete to the NIX 210 (535), where it may be utilized to maintain an accurate count of requests in process (540).

Figure 6:
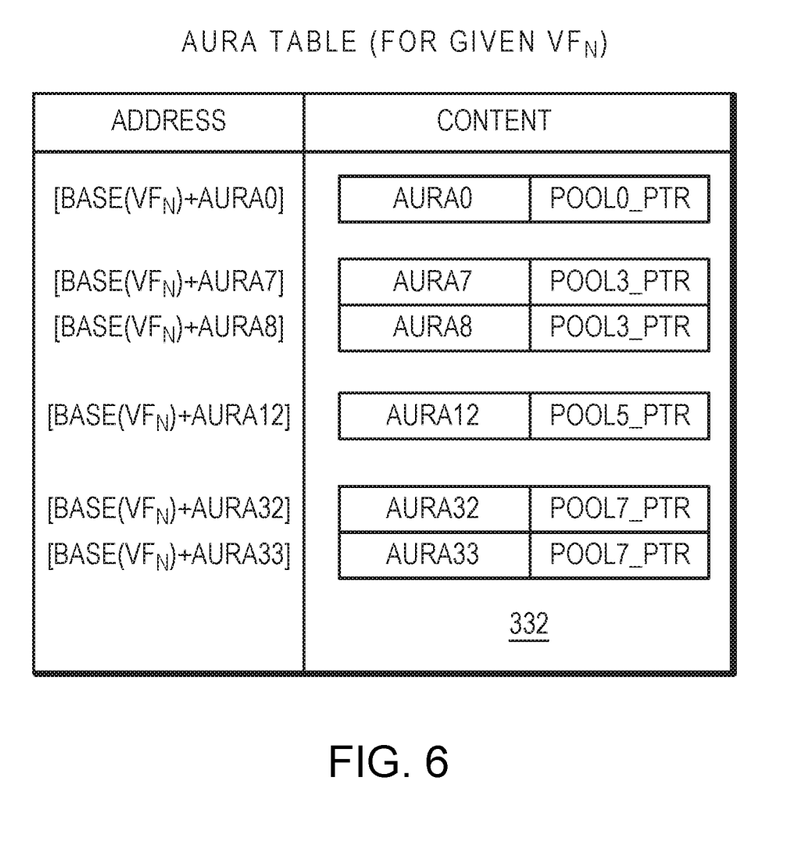
FIG. 6 is a block diagram of an aura table one embodiment.

FIG. 6 is a block diagram of the aura table 332 for a given virtual function in an example embodiment. The left column indicates an address in memory (e.g., the DRAM 108) for each entry, and the right column indicates the content of each entry. As shown, each address may be a function of a common base address (e.g., a base address that is, optionally, specific to the VF) that is offset by a value derived from the respective aura ID and/or other value associated with the request, such a VF number. Each entry of the table 332 may comprise the aura ID as well as the corresponding pool pointer. As described above, multiple auras (e.g., aura1 and aura8) may be associated with a common pool (e.g., pool3). Due to the derived addresses of each entry, the entries may occupy discontiguous addresses of the memory.

Figure 7:
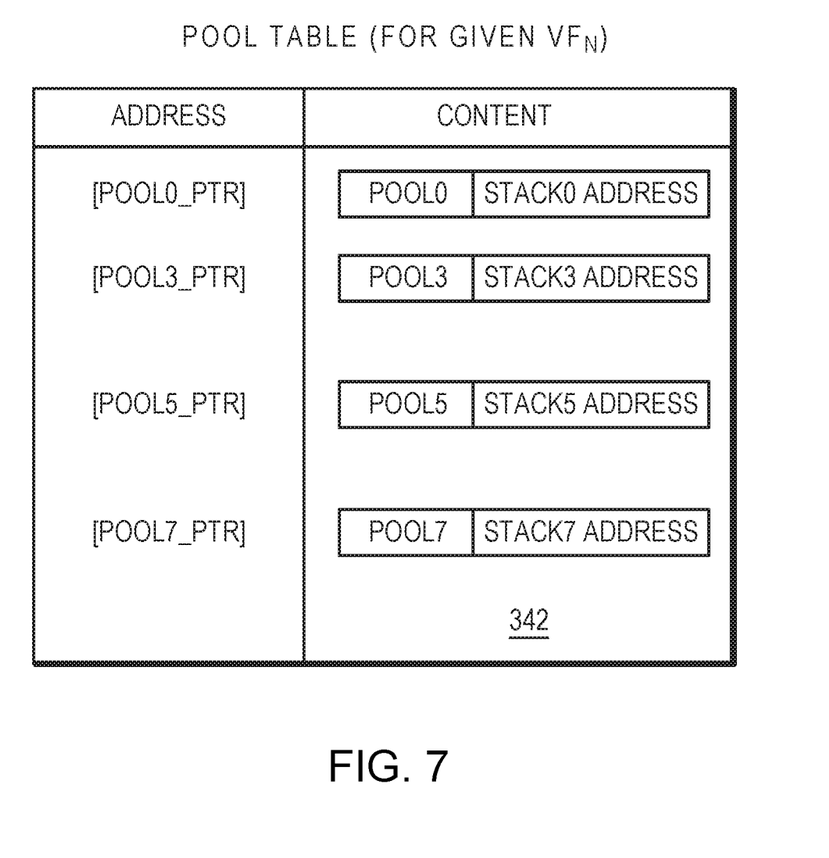
FIG. 7 is a block diagram of a pool table one embodiment.

FIG. 7 is a block diagram of the pool table 342 in an example embodiment. Similar to the aura table 332, the left column of the pool table 342 indicates an address in memory (e.g., the DRAM 108) for each pool, and the right column indicates the content of that pool. The entry of the table 332 may comprise a pool identifier (ID), which identifies the pool, as well as the address of the corresponding stack. As described above, in an example embodiment, each pool may be associated exclusively with a respective stack, and the stack address may point to a starting address of the stack in memory.

Figure 8:
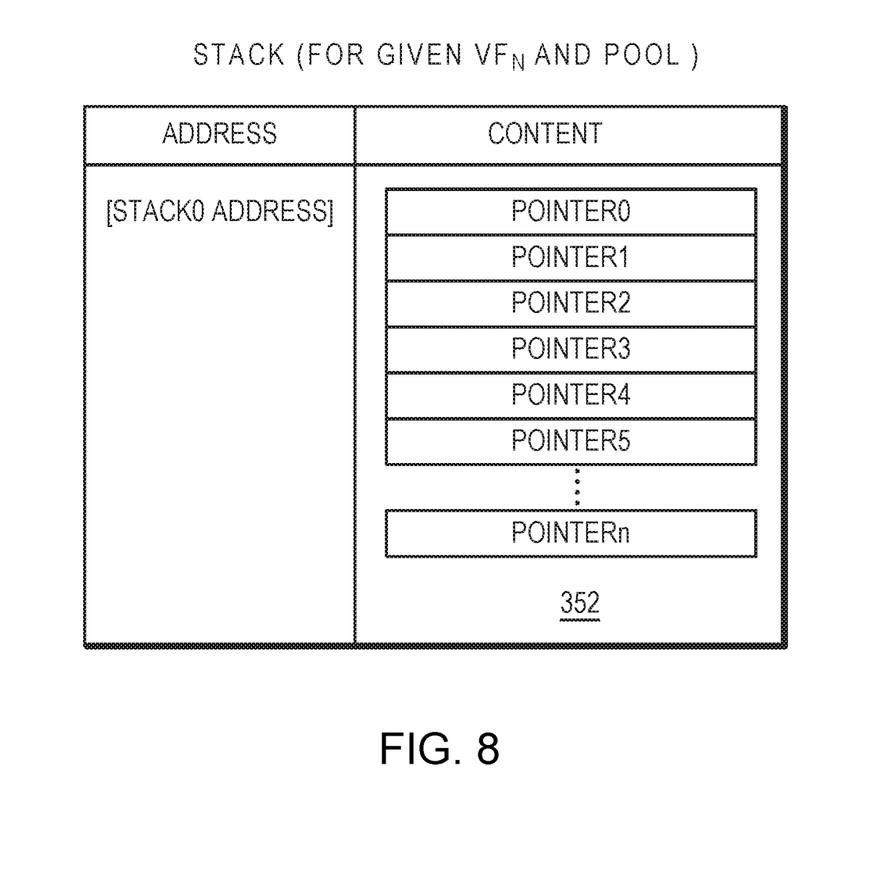
FIG. 8 is a block diagram of a stack in one embodiment.

FIG. 8 is a block diagram of the stack 352 in one embodiment. The left column indicates the aforementioned stack address, which points to a starting address to the stack 352 that can be used by the stack stage 350 to access the stack 352. The left column illustrates the content of the stack 352, which includes the constituent pointers to memory. During a pointer allocation, the stack stage 350 may access the selected stack 352 to retrieve the available pointer in the stack 350, and the retrieved pointer may be either removed from the stack or marked as unavailable. Conversely, during a pointer free operation, the stack stage 350 may return the pointer to the stack 352 by writing it to the stack or marking the pointer as available. The stack 352 may be one of several stacks stored to memory, where each stack is associated with a different pool.

The aura table 332, pool table 342 and stack 352 may be configured in a number of different ways. As shown in FIG. 3, the tables 332, 342 and stack 352 are written to the DRAM 108, which may also be the memory that is allocated by the NPA 214. Alternatively, the tables 332, 342 and stack 352 may occupy a separate storage device. Further, the tables 332, 342 may be configured as a single lookup table, separate tables, or may each comprise multiple tables that each correspond to a respective pool, virtual function, process, core, or other characteristic of the requests.

While example embodiments have been particularly shown and described, it will be understood by those skilled in the art that various changes in form and details may be made therein without departing from the scope of the embodiments encompassed by the appended claims.

What is claimed is:

1. A method, comprising:
   determining an aura identifier (ID) of a request to allocate a pointer to a memory;
   determining a pool pointer based on the aura ID;
   generating a pool table entry as a function of the pool pointer;
   writing the pool table entry to a pool table;
   determining a stack address based on the pool table entry;
   allocating a pointer of the stack to the request; and
   outputting the pointer to an entity originating the request.

2. The method of claim 1, further comprising:
   generating an aura table entry as a function of the aura ID and a base address;
   wherein determining the pool pointer includes determining the pool pointer according to the aura table, the pool pointer being associated with the stack of pointers to the memory.

3. The method of claim 1, wherein the aura ID indicates a class of the request, the class being at least one of a priority and color for quality of service (QoS) enforcement.

4. The method of claim 1, wherein the pool pointer is one of a plurality of pool pointers, each of the plurality of pool pointers corresponding to a respective stack of pointers to the memory.

5. The method of claim 4, wherein the aura ID is one of a plurality of aura IDs, each of the plurality of pool pointers being associated with at least one of the plurality of aura IDs.

6. The method of claim 4, wherein each of the plurality of pool pointers is associated with a virtual function.

7. The method of claim 1, wherein the entity originating the request operates a virtual function associated with the pool pointer.

8. The method of claim 1, wherein the request is a first request, and further comprising:
   determining a second aura identifier (ID) of a second request, the second request being a request to free the pointer to the memory;
   determining a second pool pointer based on the second aura ID;
   determining a second stack address based on the second pool pointer according to the pool table; and
   freeing the pointer of the stack.

9. The method of claim 1, further including caching at least a subset of an aura table, the pool table, and the stack.

10. The method of claim 1, wherein generating the entry for a pool table is a function of a virtual function of the request.

11. The method of claim 1, wherein the pool table is stored to the memory.

12. The method of claim 1, further comprising invalidating entries of the pool table in response to a request to free a pointer to the memory.

13. A circuit, comprising:
   an aura stage configured to 1) determine an aura identifier (ID) of a request to allocate a pointer to a memory, and 2) determine a pool pointer based on the aura ID;
   a pool stage configured to 1) generate a pool table entry as a function of the pool pointer, 2) write a pool table entry to a pool table, and 3) determine a stack address based on the pool table entry; and
   a stack stage configured to 1) allocate a pointer of the stack to the request, and 2) output the pointer to an entity originating the request.

14. The circuit of claim 13, wherein the aura stage is further configured to 1) generate an aura table entry as a function of the aura ID and a base address, and 2) determine the pool pointer according to the aura table, the pool pointer being associated with the stack of pointers to the memory.

15. The circuit of claim 13, wherein the aura ID indicates a class of the request, the class being at least one of a priority and color for quality of service (QoS) enforcement.

16. The circuit of claim 13, wherein the pool pointer is one of a plurality of pool pointers, each of the plurality of pool pointers corresponding to a respective stack of pointers to the memory.

17. The circuit of claim 16, wherein the aura ID is one of a plurality of aura IDs, each of the plurality of pool pointers being associated with at least one of the plurality of aura IDs.

18. The circuit of claim 16, wherein each of the plurality of pool pointers is associated with a virtual function.

19. The circuit of claim 13, wherein the entity originating the request operates a virtual function associated with the pool pointer.

20. The circuit of claim 13, wherein the request is a first request, wherein:
- the aura stage is further configured to 1) determine a second aura identifier (ID) of a second request, the second request being a request to free the pointer to the memory, and 2) determine a second pool pointer based on the second aura ID;
- the pool stage is further configured to determine a second stack address based on the second pool pointer according to the pool table; and
- the stack stage is further configured to free the pointer of the stack.

21. The circuit of claim 13, wherein the pool stage generates the entry for the pool table as a function of a virtual function of the request.

* * * * *